United States Patent [19]

Borchers

[11] Patent Number: 5,213,390
[45] Date of Patent: May 25, 1993

[54] VEHICLE MOUNTABLE RECONFIGURABLE SHELTER

[76] Inventor: Daniel L. Borchers, 2150 S. St. Paul St., Denver, Colo. 80210

[21] Appl. No.: 733,988

[22] Filed: Jul. 22, 1991

[51] Int. Cl.⁵ ............................................. B60P 3/32
[52] U.S. Cl. ..................... 296/165; 296/100
[58] Field of Search ............. 296/100, 39.2, 156, 296/163, 164, 165, 167

[56] References Cited

U.S. PATENT DOCUMENTS

| | | |
|---|---|---|
| 3,746,386 | 7/1973 | Woodward . |
| 3,923,334 | 12/1975 | Key .................... 296/100 X |
| 3,953,066 | 4/1976 | Hamilton ............ 296/165 X |
| 4,088,363 | 5/1978 | Palmer . |
| 4,496,184 | 1/1985 | Byrd et al. . |
| 4,544,195 | 10/1985 | Gunn ................. 296/165 X |
| 4,566,729 | 1/1986 | Magnino . |
| 4,756,571 | 7/1988 | Lake ................... 296/100 |
| 4,815,786 | 3/1989 | McRay ............... 296/165 |
| 4,858,986 | 8/1989 | Whitley et al. .... 296/165 |

OTHER PUBLICATIONS

"Custom-Fit Truck-Bed Tents" Promotional Item from Whitney & Sons Catalog.
Eagle's Nest Advertisement.
Wildernest Promotional Brochure.
"Soft Shell", Truckin Magazine, Nov. 1990.
"California Concepts" Promotional Materials.
"Saxy Add-On", Truckin Magazine, Sep. 1990.
Super Stallion (Tip-Top-Tonno) Promotional Materials.
Warn (Aerocover) Promotional Materials.
"Full-Coverage 1-Pc. Bed Protectors For All Pickup Trucks", Whitney & Sons Catalog.

Primary Examiner—Russell D. Stormer
Assistant Examiner—Joseph D. Pape
Attorney, Agent, or Firm—Harold A. Burdick

[57] ABSTRACT

A variable configurable shelter is disclosed mountable to walls defining the cargo carrying area of a truck. The shelter includes structure defining the upper portion of the shelter which is pivotably mounted at one end thereof to one of the walls for movement between first and second relative positions. The structure includes a relatively rigid shell which provides a protective cover over the cargo carrying area when the structure is in the second relative position. Shelter walls are connected with the structure and are maintained adjacent to the shell in the second relative position, the shelter walls being securable to the truck when the structure is moved to the first relative position to thus provide, in combination with the shell, a covered lodging at the cargo carrying area.

19 Claims, 5 Drawing Sheets

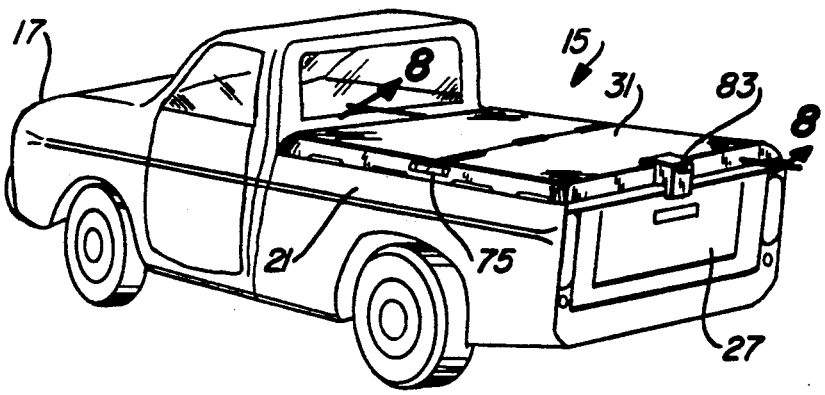
Fig_1A
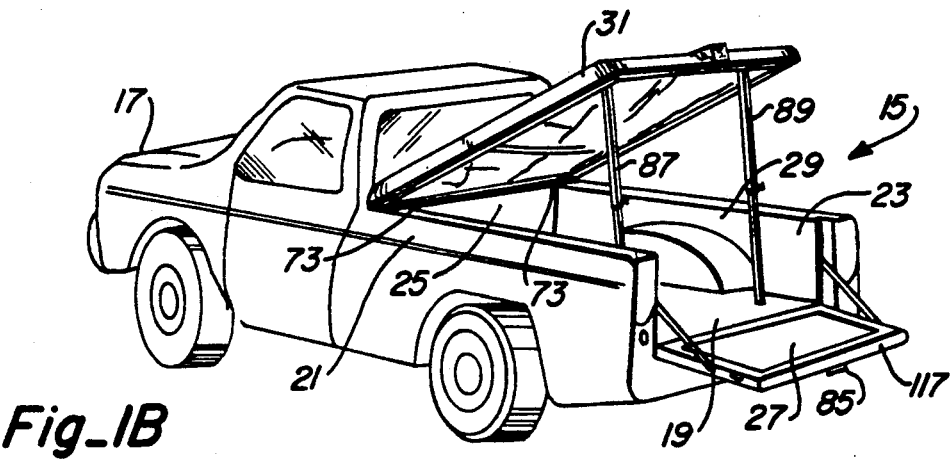
Fig_1B
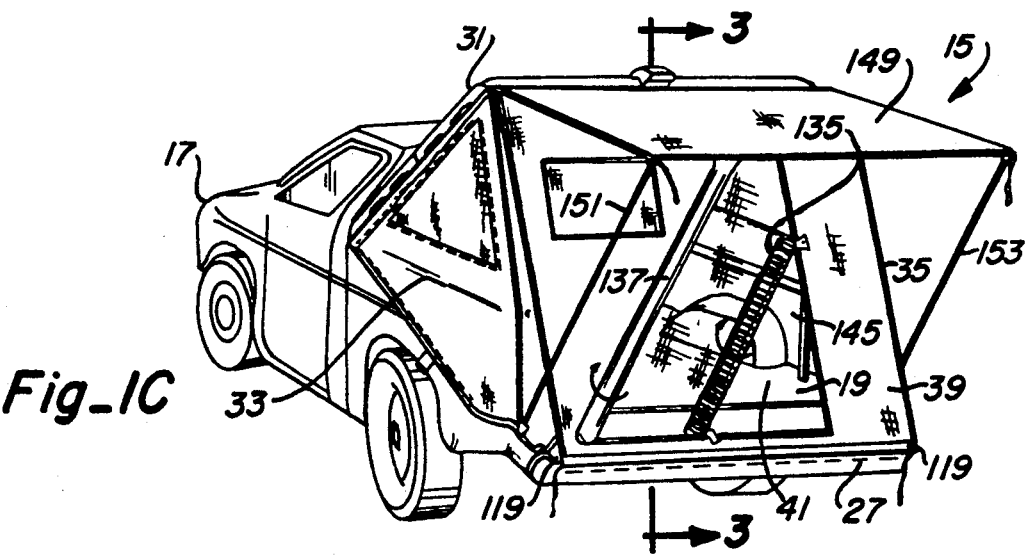
Fig_1C

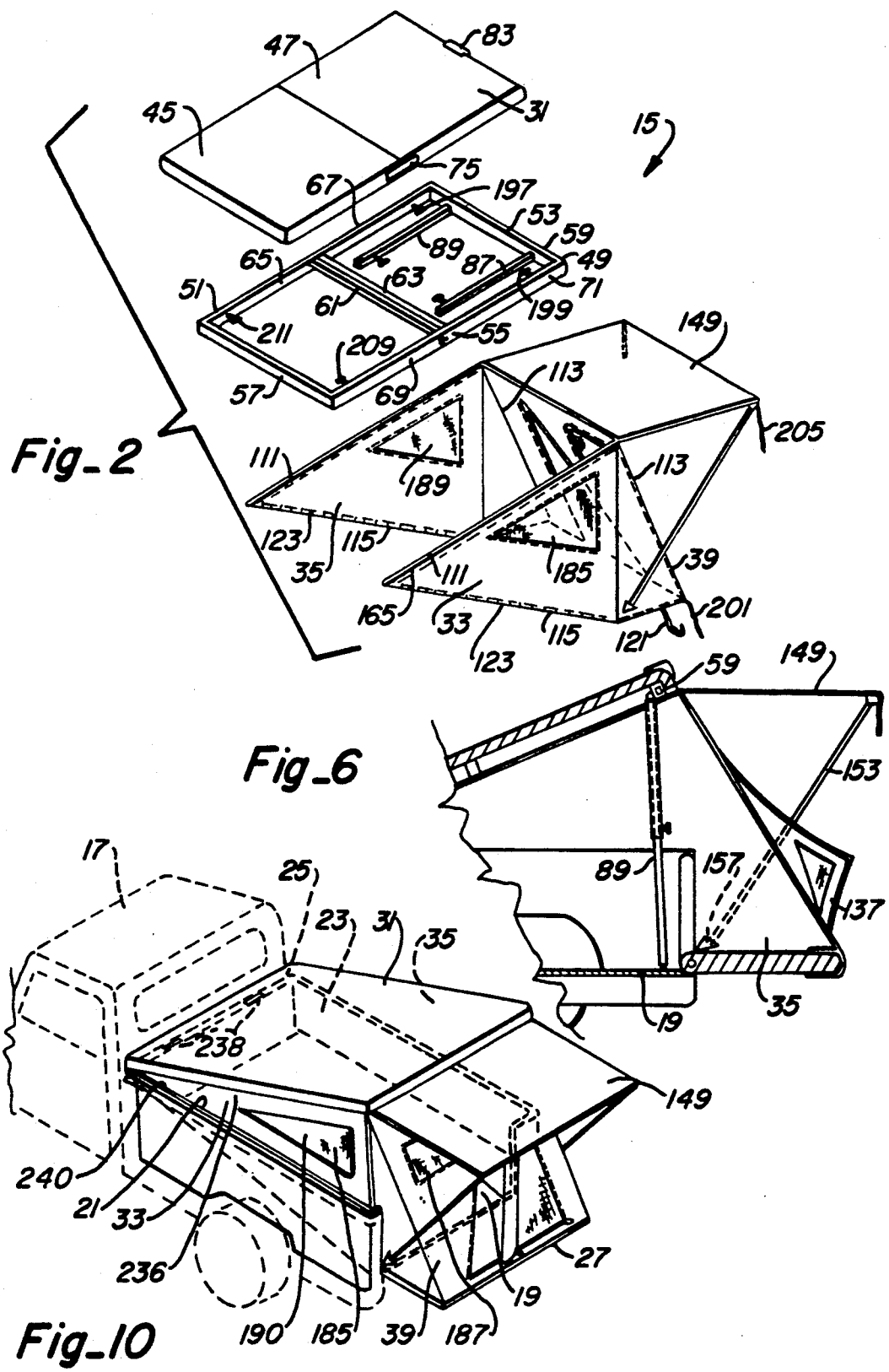

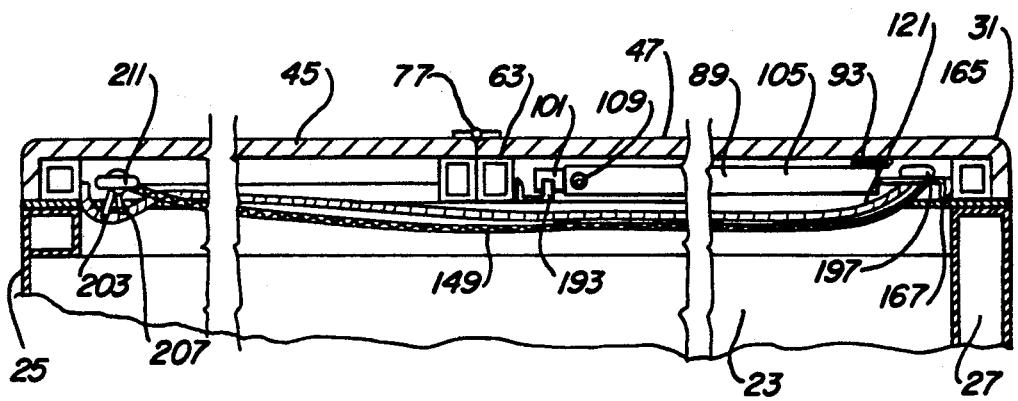
Fig_8
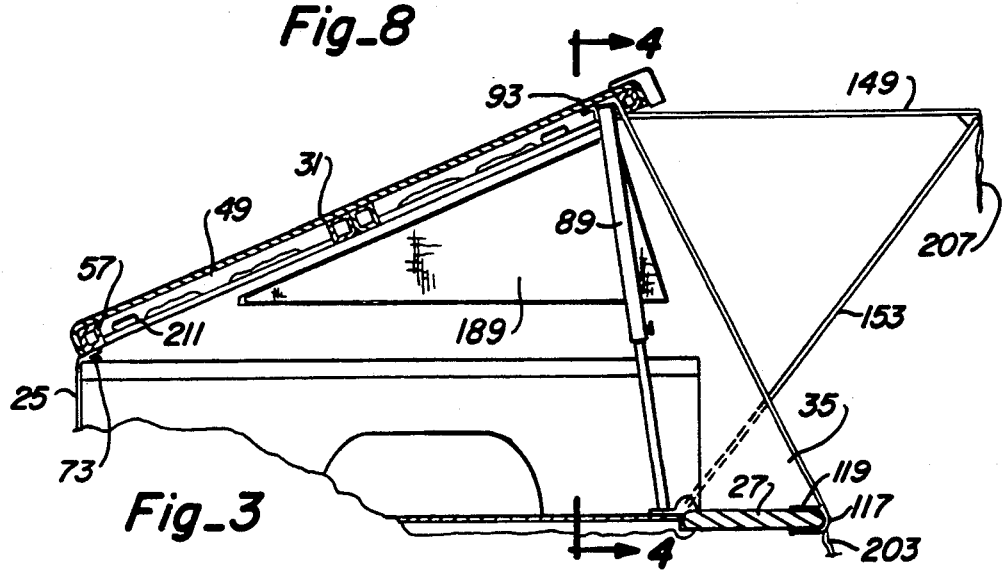
Fig_3
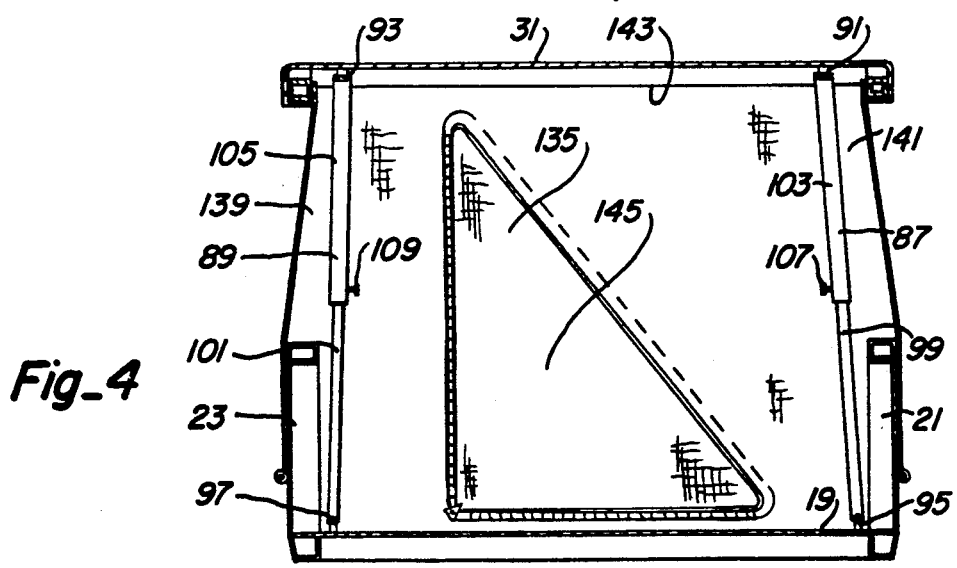
Fig_4

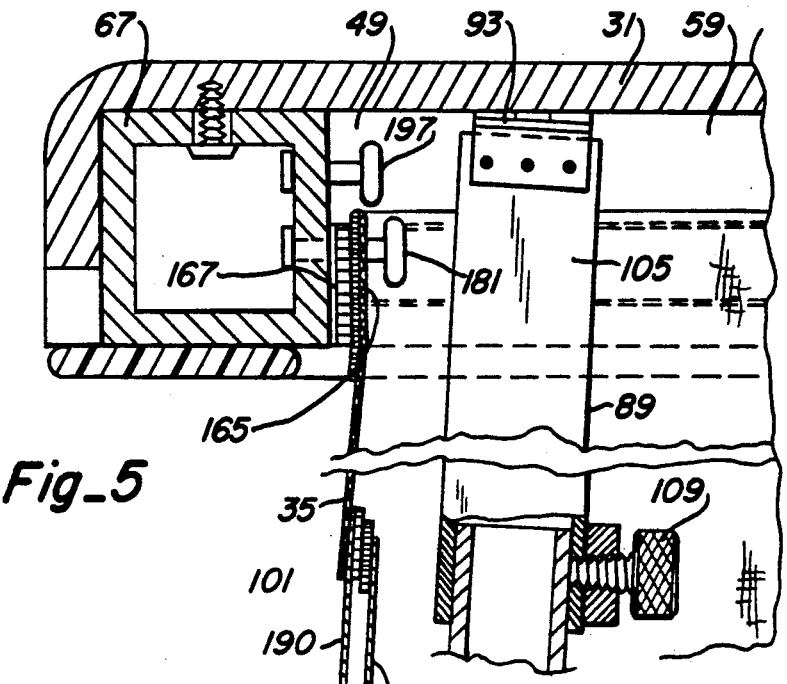
Fig_5
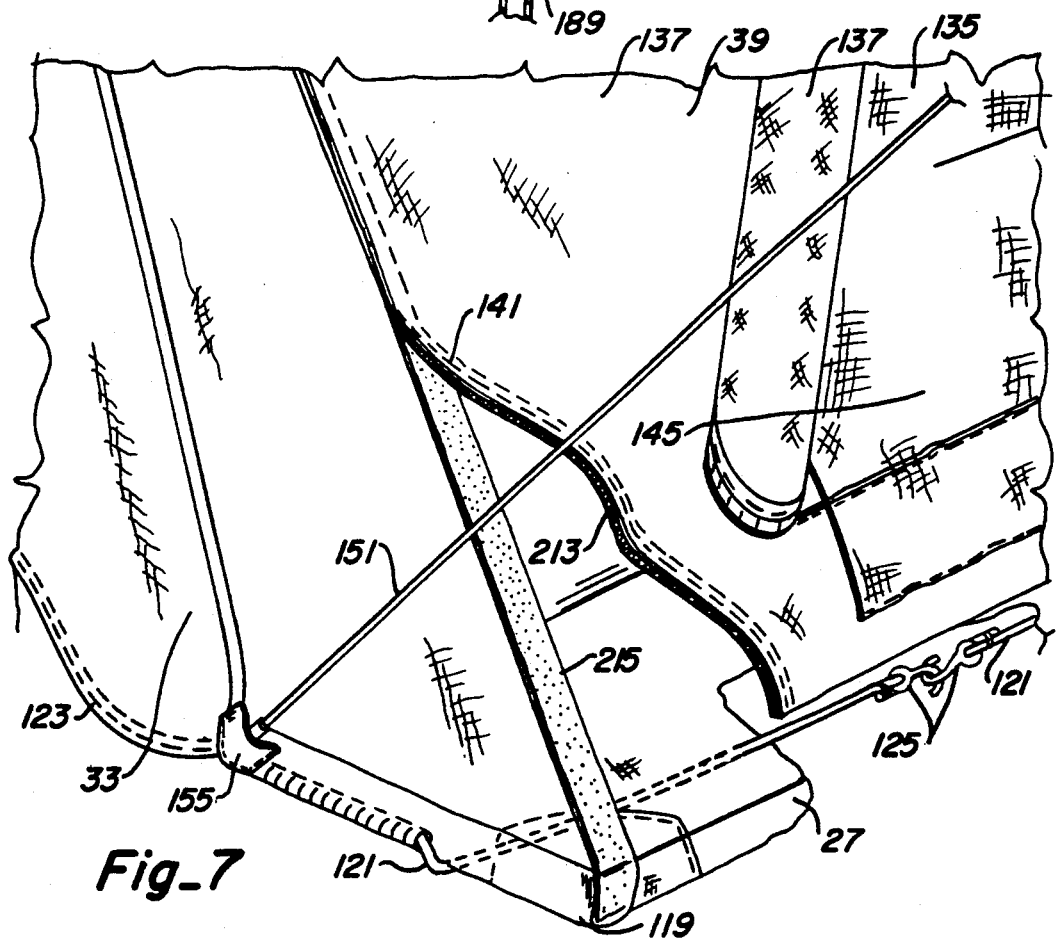
Fig_7

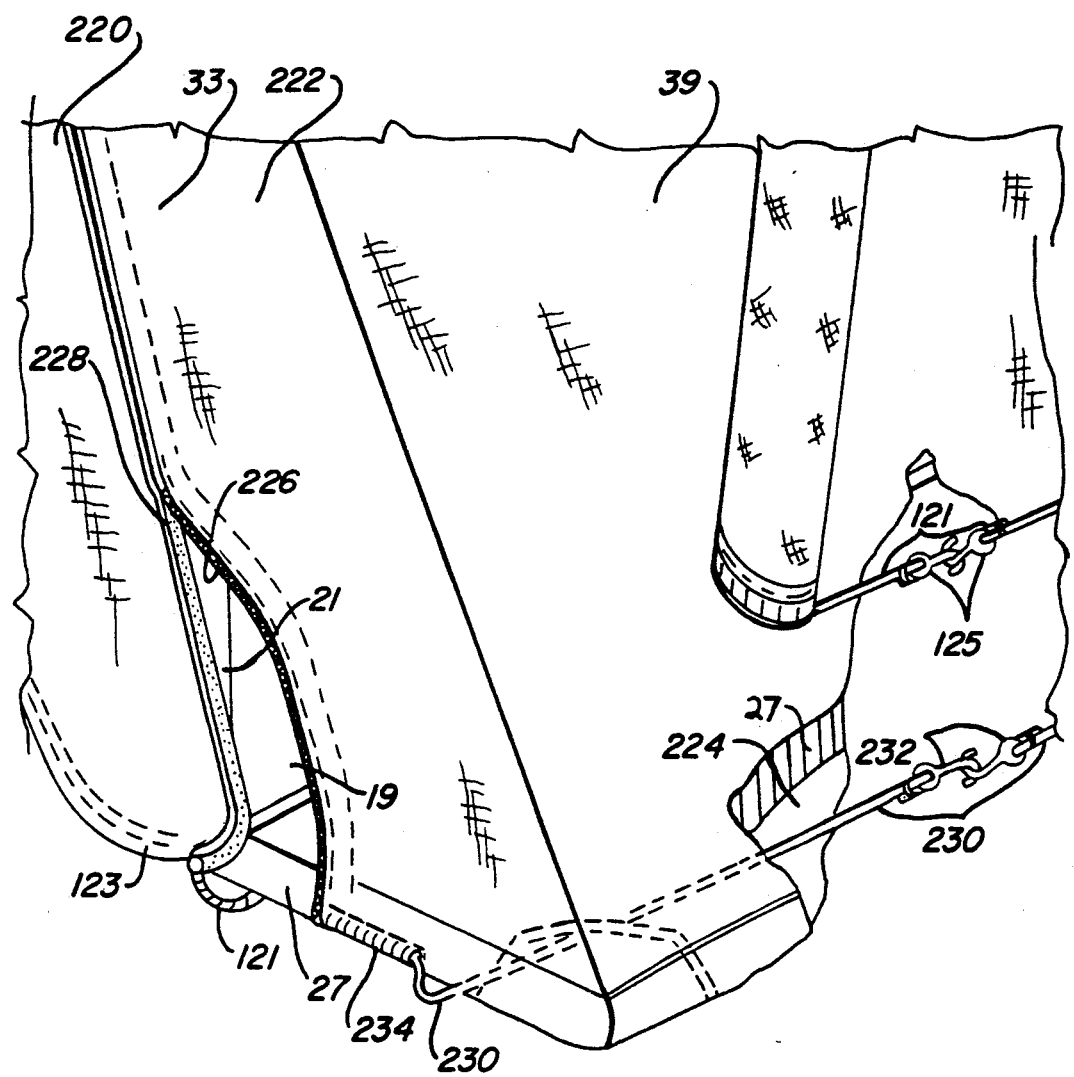
Fig_9

5,213,390

VEHICLE MOUNTABLE RECONFIGURABLE SHELTER

FIELD OF THE INVENTION

This invention relates to sheltering structures, and, more particularly, relates to vehicle mountable shelters.

BACKGROUND OF THE INVENTION

Vehicle mountable shelters, such as camper shells, tents, cargo bed covers and the like for pick-up trucks, have been heretofore suggested and/or utilized for a variety of purposes including providing temporary shelter for occupants and/or cargo (see, for example, U.S. Pat. Nos. 3,746,386, 4,566,729, 4,088,363, and 4,496,184). Some heretofore known shelters have been collapsible and/or removable, thereafter storage of such shelters requiring either a remote storage area or storage space in at least some, often substantial, part of the vehicle's cargo carrying area.

While such shelters have thus been effective while in use (i.e., when providing shelter for occupants for example), such shelters have not always proven to be entirely satisfactory when not in use, occupying or unduly limiting vehicle storage space, and/or have been overly complex, and/or cumbersome to install and remove or erect and collapse. Further improvement in vehicle mountable shelters could thus still be utilized.

SUMMARY OF THE INVENTION

This invention provides a vehicle (for example a pick-up truck) mountable reconfigurable shelter which is variously configurable to provide, in conjunction with the cargo carrying area of the vehicle, either an accessible lodging area for camping or the like, or a relatively rigid and secure protective cover for the cargo carrying area. The shelter includes a portion defining a top area, preferably having a rigid framework and an outer shell, pivotably connected at one end thereof adjacent to a bed wall of the cargo carrying area and releasably securable at an opposite end thereof to a tailgate. Pliant shelter walls are connected with the portion defining the top area, one of the walls having an access defined thereat configured for occupant access therethrough.

When the top area portion is pivoted to a first relative position, the shelter walls are securable to the vehicle to thus define a lodging area. When the vehicle is to be moved or when the lodging area is otherwise not in use, the shelter walls are stored and retained closely adjacent to the top area portion (utilizing at least in part the same means used to secure the walls to the vehicle) so that no space is occupied thereby in the bed of the cargo carrying area when the top area portion is moved to a second relative position with the opposite end thereof secured to the tailgate. Cargo carrying area is thus preserved and cargo carrying utility enhanced by providing a substantially water tight cover for the cargo area, with the shelter being rapidly and simply reconfigurable to provide a lodging area secure from the elements.

It is therefore an object of this invention to provide a reconfigurable vehicle mountable shelter for both sheltering a cargo carrying area of the vehicle in a first configuration and for providing a lodging area in a second configuration.

It is another object of this invention to provide a vehicle mountable shelter which preserves space and enhances utility of the cargo carrying area of the vehicle while being quickly and simply reconfigurable to provide a lodging area for camping or the like.

It is still another object of this invention to provide a readily reconfigurable shelter mountable on a vehicle normally including an uncovered transporting structure at the time of vehicle manufacture, the shelter including a top area defining portion connectable at one end adjacent to the transporting structure for pivoting movement between first and second relative positions and shelter walls connected with the defining portion and securable to the vehicle when the defining portions are in the first relative position, one of the shelter walls having an occupant access defined thereat, the shelter walls and the transporting structure defining a lodging area when thus configured, the shelter walls being stored and retained adjacent to the defining portion when the defining portion is at the second relative position.

It is still another object of this invention to provide a readily reconfigurable shelter mountable at the cargo carrying area of a truck which includes a framework pivotably connected at one end adjacent to the cargo carrying area, a shell connected to the framework, and pliant walls connected with the framework.

It is yet another object of this invention to provide a readily reconfigurable shelter mountable at the bed walls and tailgate defining the cargo carrying area of a truck, the shelter including pliant walls and a relatively rigid portion pivotably connected with one of the bed walls and of a size sufficient to cover the cargo carrying area, the pliant walls being connected with the relatively rigid portion and selectively securable to the truck or closely adjacent to the relatively rigid portion.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIGS. 1A, 1B and 1C are perspective views illustrating the shelter of this invention in various configurations;

FIG. 2 is an exploded view illustrating the component parts of the shelter of FIG. 1;

FIG. 3 is a sectional view taken through section lines 3—3 of FIG. 1C;

FIG. 4 is a sectional view taken through section lines 4—4 of FIG. 3;

FIG. 5 is a sectional view illustrating attachment of the shelter walls, framework and protective shell of the reconfigurable shelter of this invention taken through section lines 5—5 of FIG. 3;

FIG. 6 is a sectional view of the access side of the shelter of this invention;

FIG. 7 is a detailed view of the access side of the shelter illustrating a first configuration of a portion of the shelter walls for releasably securing the walls to the vehicle;

FIG. 8 is a sectional view taken through section lines 8—8 of FIG. 1A;

FIG. 9 is a detailed view of the access side of the shelter illustrating a second configuration of the shelter walls for releasably securing the walls to the vehicle; and FIG. 10 is a perspective view of an alternative embodiment of the vehicle mountable shelter of this invention.

DESCRIPTION OF THE INVENTION

FIGS. 1A, 1B, and 1C illustrate the shelter of this invention in various configurations mounted on vehicle 17 (a pick-up truck having truck bed 19, truck bed side walls 21 and 23, forward wall 25 and tailgate 27 defining cargo carrying area 29, the transporting structure normally found in such pick-up trucks and which is normally uncovered at the time of vehicle manufacture).

FIG. 1A shows shelter 15 configured for use as a secured substantially water tight protective cover for cargo carrying area 29. FIG. 1B illustrates shelter 15 with protective cover 31 (for example a plastic shell) in the raised supported position but with the shelter walls not yet removed from the stored position below cover 31. FIG. 1C illustrates shelter 15 having shelter wall sections 33, 35 and 39 released from storage beneath cover 31 and deployed on vehicle 17 and tailgate 27 (with tailgate 27 in the opened position) to provide lodging area 41 defined by cover 31, shelter walls 33, 35 and 39, and cargo carrying area 29 of vehicle 17.

Turning now to FIG. 2, shelter 15 includes cover 31 including first and second cover sections 45 and 47. Cover 31 is mounted on framework 49 (for example by screwing, gluing or the like). Framework 49 includes first and second framework sections 51 and 53 pivotably mounted by hinges 55 (only one of which is shown in FIG. 2, a similar hinge arrangement being present directly opposite framework 49 from hinge 55) to one another. Framework 49 includes framework members 57, 59, 61, 63, 65, 67, 69 and 71 joined, for example, by screwing, welding or the like (the framework being made, for example, of extruded aluminum). Framework 49 is mounted to rear wall 25 of the vehicle utilizing hinges 73 (as shown in FIGS. 1B and 3) so that the entire cover 31 and frame 49 may be raised and lowered as illustrated in FIGS. 1A through 1C.

Lock out members 75 (only one of which is shown, an identical lock out member being present on the opposite side of cover 31), for example a sliding hasp and retainers or the like, prevent pivoting movement at hinges 55 when the cover is to be utilized as illustrated in FIG. 1C. By retraction of the hasp from its retainer, pivoting movement at hinges 55 is accommodated thereby permitting only cover section 47 and framework section 53 to be raised and lowered for more convenient access to cargo carrying area 29 for deposit and removal of cargo. A flexible seal 77 (shown in FIG. 8) is provided to seal the interface between cover sections.

Alternatively, or in addition, the framework and cover sections can be hinged relative to one another so that the sections pivot 180° (measuring the movement of sections 47/53 toward sections 45/51) to form a more conveniently storable unit on occasions when the shelter of this invention is not mounted to the vehicle.

Cover 31 and framework 49 are latched to tailgate 27 utilizing latch 83 mounted, for example by screwing, through cover section 47 to framework member 59. Receiving member 85 is mounted to tailgate 27 for retaining the protective cover securely when the vehicle is in motion or when access to the cargo area is otherwise undesirable (any known locking mechanism could be utilized).

Turning now to FIGS. 3 through 8, Telescoping support arms 87 and 89 are provided pivotably mounted at cover 31 on hinges 91 and 93. Receiving posts 95 and 97 are mounted on truck bed 19, for example by welding, screwing or the like, for receipt of lower portions 99 and 101, respectively, of telescoping support arms 87 and 89. Lower portions 99 and 101 of support arms 87 and 89 are slidably receivable in upper portions 103 and 105 of the support arms and are maintained at the selected length utilizing tensioning knobs 107 and 109 (connected, for example, with an indexed set screw).

It is to be realized that any number of support arm arrangements could be provided, for example, utilizing similar arms hingedly mounting to the truck bed for connection at retainers mounted to framework member 59, hydraulic systems mounted between truck bed walls and the framework, or any other support mechanism for retention of cover 31 in the raised position.

Shelter walls sections 33 and 35 are substantially triangular shaped members each having a first dimension 111 substantially equivalent to or less than the overall length of framework members 69 and 71, a second dimension 113 equal or, preferably, exceeding a length defined by the distance between framework member 59 and truck bed 19 when cover 31 is in the raised position as illustrated in FIG. 1C, and a third dimension 115 equal to or exceeding the distance from bed wall 25 to the end of truck bed 19 (see FIG. 2). Preferably, dimensions 115 are substantially the same as the length from bed wall 25 to end 117 of tailgate 27 when in the lowered position, and with dimensions 113 substantially equal to or exceeding the distance defined between framework member 59 and end 117 of tailgate 27 in the lowered position when cover 31 is in the raised position.

As shown in FIG. 7 (showing wall 33, it being understood that wall 35 includes the same structure), shelter walls 33 and 35 each include reinforced pockets 119 receivable around the corners of tailgate 27 and flexible tensioning lines 121 extending substantially the full length of dimension 115 of the walls. Lines 121 are restrained in hems 123, for example by knotting at one end, and have hooks 125 at the opposite end thereof for engagement with one another below tailgate 27 when the walls are deployed. In this manner, the walls are maintained tightly against the outer portion of bed rails 21 and 23 and in close contact with the sides of tailgate 27.

While not illustrated, to further enhance the contour and fit of side walls 33 and 35 as shown in FIG. 7, additional tensioning elements could be provided at a position along dimensions 115 (for example, adjacent to the rearward portion of cargo carrying area side walls 21 and 23), each having mutually engagable hooks for drawing the side walls tightly around the rearward portions of bed walls 21 and 23.

End wall 39 includes a net mesh section 135 and water shedding section 137 of substantially similar dimensions joined at outer edges 139, 141 and 143 but left unconnected at the bottom, with zippered access opening 145 separately defined through both sections 135 and section 137 to allow user access therethrough. Substantial air movement can be accommodated by opening of the access at section 137 while leaving mesh section 135 zippered, thus preventing passage therethrough of insects and the like (as shown in FIG. 4).

Canopy, or rainfly, 149 is joined at upper edge 143 with end wall 39. Canopy support posts 151 and 153 are engagable in reinforced pockets 155 and 157 of walls 33 and 35, respectively, and at the corners of canopy 149.

Canopy 149, section 137 of end wall 39, and side walls 33 and 35 are all formed of a durable, but pliant and waterproof material, for example treated rip-stop nylon or the like.

Rear wall 39 and canopy 149, side wall 33 and side wall 35 may be connected with framework 49 in any convenient, yet easily detachable, way. For example, as shown in FIGS. 5 and 8, Velcro fasteners 165 and 167 attached to the shelter walls and to framework 49, respectively, could be utilized. Where greater support is desired, cleat pins 181 could be utilized or additionally provided. Any other known attachment system could be utilized (it being desirable, however, that the walls be removable for cleaning and the like).

While rear wall section 39 and wall sections 33 and 35 could be permanently seamed, ease of handling and removal is better achieved if separate cloth panels, or units, are provided and maintained at their junction by Velcro fasteners (as illustrated in FIG. 7 for walls 33 and 39 at 213 and 215, wall 35 being maintained in releasable contact with wall 39 in the same fashion). In this manner, when erected, substantially water tight lodging area 41 is maintained.

Vinyl window units 185, 187 and 189 may be provided, and are preferably detachable from the walls, for example utilizing Velcro brand fasteners. Material mesh 190 is sewn in all window openings to provide air circulation within the shelter when the vinyl window units are removed.

When not in use, support arms 87 and 89, and walls 33, 35 and 39 and canopy 149 are collapsed and held in close proximity to framework 49 for storage. Support arms 87 and 89 are held at catches 193 (as shown in FIG. 8 for arm 89) attached to framework member 63. Wall members 33 and 35 are folded inwardly and retained utilizing lines 121 and/or hooks 125 at retaining cleats 197 and 199 (wall 33 being retained at cleat 197 and wall 35 being retained at cleat 199). Retaining lines 201, 203, 205, and 207 are provided at wall 39 and canopy 149, which are folded inwardly and over walls 33 and 35, with lines 201 and 205 being retained at cleat 209 and with lines 203 and 207 being retained at cleat 211. In order to erect the shelter, the lines are merely released from their respective cleats and reconnected around the vehicle as heretofore described.

FIG. 9 shows a second embodiment of an arrangement of wall sections 33, 35 and 39 for securing the shelter to vehicle 17 (FIG. 9 illustrating the relationship of wall sections 33 and 39, it being understood that wall section 35 includes the same structure and relationship to wall 39 to achieve the illustrated function).

Wall section 33 is defined by separate side wall portions 220 and 222, portion 222 being permanently affixed to wall section 39 and bottom portion 224. Wall portion 222 (and a similarly configured portion defining wall section 35 on the opposite side of the vehicle), bottom portion 224, and wall section 39 form a wedge shaped structure receivable over tailgate 27. Velcro fasteners 226 and 228 are engaged along the junction of portions 220 and 222, for both sealing the opening thereat and drawing wall portion 220 around the rearward part of bed wall 21. Resilient cords 121 and hooks 125 are provided as before, and additional resilient lines 230 and hooks 232 may also be provided in hems 234 of wall portions 222 to further secure and tighten the wedge shaped structure at tailgate 27. Storage of the shelter thus configured is achievable in substantially the same manner as heretofore described.

An alternative embodiment of the invention is illustrated in FIG. 10 which includes all of those elements previously described for shelter 15 but further including a truck bed lining insert 236 having cover and frame assembly 31/49 pivotably attached thereto at hinge 238. The liner 236 (made for example of a durable plastic material) lines the entire bed 19, and the inward side of bed walls 21, 23 and 25, and is open at the rear portion (corresponding with its position adjacent to tailgate 27). Bed liner 236 includes upper flange 240 around the periphery thereof for attachment to bed rails 21, 23 and/or 25. In this manner, an insertable unit is provided which requires only attachment of bed liner 236 to the cargo carrying area of the vehicle.

As may be appreciated from the foregoing, a readily reconfigurable shelter for use on vehicles is disclosed, the shelter being utilized to provide a lodging area, for camping and the like, in one configuration, and to securely cover the cargo carrying area of the vehicle in a second configuration while conserving cargo carrying space.

What is claimed is:

1. A readily reconfigurable shelter mountable on a vehicle, the vehicle normally including an uncovered transporting structure at the time of vehicle manufacture, said shelter comprising:

a cover portion connectable at one end thereof to the transporting structure for pivoting movement of said cover portion between a first relative position and a second relative position covering the transporting structure; and shelter walls connected with said cover portion and securable to the vehicle when said cover portion is moved to said first relative position, one of said shelter walls having an access defined thereat configured to permit occupant access therethrough, said shelter walls and the transporting structure defining a lodging area when said cover portion is at said first relative position, and said shelter walls being configured for storage adjacent to said cover portion when said cover portion is at said second relative position so that said shelter walls occupy substantially no space in the transporting structure when said cover portion is at said second relative position.

2. The shelter of claim 1 further comprising retaining means for securing said shelter walls to the vehicle and for retaining said shelter walls when stored.

3. The shelter of claim 1 wherein the vehicle is a truck and the uncovered transporting structure is a truck bed having bed walls and a tailgate, and wherein said cover portion includes a framework structure having members configured to rest on the bed walls and tailgate when in said second relative position.

4. The shelter of claim 1 wherein said cover portion includes a shell configured so that when said cover portion is at said second relative position a relatively rigid cover for said transporting structure is provided.

5. The shelter of claim 4 wherein said shell includes first and second sections, said second section being selectively movable relative to said first section.

6. The shelter of claim 1 further comprising means for maintaining said cover portion at said first relative position.

7. The shelter of claim 1 wherein the transporting structure is a truck bed having bed walls, the shelter further comprising a relatively rigid truck bed liner having said cover portion pivotably connected adjacent thereto.

8. A readily reconfigurable shelter mountable at the cargo carrying area of a truck, the cargo carrying area begin defined by a truck bed, first, second and third walls, and a movable tailgate opposite said third wall and extending between said first and second walls, said shelter comprising:
- a plurality of pliant walls, one of said pliant walls having an access thereat configured to permit occupant access therethrough, said pliant walls including means for releasable securement to one another;
- a pivotable portion pivotably connected adjacent to one end thereof with one of the walls defining the cargo carrying area for movement thereof between first and second relative positions, said pivotable portion begin made of material that is relatively rigid relative to said pliant walls and of a size sufficient to cover the cargo carrying area when said pivotable portion is at said second relative position, said pliant walls being connected with said pivotable portion;
- retaining means for securing said pliant walls to the truck when said pivotable portion is in said first relative position thus defining an accessible lodging area at the cargo carrying area of the truck; and
- securing means connected with at least one of said pivotable portion and any of said pliant walls for securement of said pliant walls adjacent to said pivotable portion so that said pliant walls occupy no space on the truck bed when said pivotable portion is at said second relative position.

9. The shelter of claim 8 further comprising a canopy connected with said pivotable portion adjacent to said pliant wall having said access.

10. The shelter of claim 8 further comprising a framework structure having said pivotable portion connected thereto and including members configured to rest on different ones of said tailgate and said first and second walls when said pivotable portion is in said second relative position.

11. The shelter of claim 8 further comprising a mesh material wall at said pliant wall having said access for allowing ventilation of said lodging area while preventing ready passage thereinto by insects when said access is retained in an open position.

12. The shelter of claim 8 wherein said plurality of pliant walls includes first and second side walls and said one of said walls, each of said first and second side walls having first, second, and third edges, said first edges each having a length about the same as a distance defined between said one end and an opposite end of said pivotable portion, sad second edges each having a length at least equalling a distance defined between said one end of said pivotable portion and the tail gate, and said third edges each having a length at least equaling a distance defined between the truck bed and said opposite end of said pivotable portion when said pivotable portion is at said first relative position.

13. The shelter of claim 12 wherein the tailgate has a top edge and is pivotable to an open position with the top edge space from, and in substantially the same plane as, the truck bed, and wherein said second and third edges of said side walls each have a length sufficient to extend to the top edge of the tail gate when in the open position.

14. A readily reconfigurable shelter mountable at the cargo carrying area of a truck, the cargo carrying area being defined by a truck bed, first, second, and third walls, and a movable tailgate opposite said third wall and extending between said first and second walls, said shelter comprising:
- a framework pivotably connected at one end thereof adjacent to the third wall of the cargo carrying area nd pivotable between first and second relative positions, said framework having first, second and third framework members configured for contact adjacent to the first and second walls and tailgate, respectively, of the cargo carrying area;
- a shell connected to said framework and of a size sufficient to cover the cargo carrying area when said framework is in said second relative position;
- pliant wall means connected with one of said framework and said shell for defining shelter walls when said framework is in said first relative position, said wall means having a first section having an access configured to permit occupant access therethrough;
- retaining means connected with said wall means for securing said wall means to the truck when said framework is in said first relative position; and
- securing means connected with at least one of said framework, said shell and said pliant wall means for securing said pliant wall means adjacent to said framework and said shell so that said pliant wall occupy no space on the truck bed when said framework is at said second relative position.

15. The shelter of claim 14 wherein said wall means includes second and third sections each having a triangular configuration, one edge of each of said second and third sections having a length greater than a distance defined between said one end of said framework and the tailgate, said retaining means extending at least said length of said edges of said second and third sections.

16. The shelter of claim 14 wherein said framework and said shell each include first and second sections, said second sections being selective movable relative to said first sections.

17. The shelter of claim 14 further comprising a canopy connected with one of sad framework and said shell adjacent to said first section of said wall means, said first section of said wall means including a mesh material portion.

18. The shelter of claim 14 further comprising a relatively rigid truck bed and bed wall liner having said framework pivotably connected adjacent thereto.

19. The shelter of claim 14 wherein said wall means includes releasable connecting means for releasably connecting said wall means with one of said framework and said shell.

* * * * *